United States Patent
Akhter

(10) Patent No.: US 10,230,476 B1
(45) Date of Patent: Mar. 12, 2019

(54) METHOD AND APPARATUS FOR FLEXIBLE COHERENT AND SCALE-OUT COMPUTING ARCHITECTURE

(71) Applicant: Mohammad Shahanshah Akhter, Ottawa (CA)

(72) Inventor: Mohammad Shahanshah Akhter, Ottawa (CA)

(73) Assignee: INTEGRATED DEVICE TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 15/439,731

(22) Filed: Feb. 22, 2017

Related U.S. Application Data

(60) Provisional application No. 62/298,341, filed on Feb. 22, 2016.

(51) Int. Cl.
| | |
|---|---|
| *H04Q 11/00* | (2006.01) |
| *H04J 14/02* | (2006.01) |
| *H04J 14/00* | (2006.01) |
| *H04B 10/80* | (2013.01) |
| *G06F 13/42* | (2006.01) |
| *G06F 13/40* | (2006.01) |

(52) U.S. Cl.
CPC ....... *H04B 10/801* (2013.01); *G06F 13/4022* (2013.01); *G06F 13/4282* (2013.01); *H04Q 11/0003* (2013.01); *H04Q 11/0062* (2013.01); *H04Q 2011/0086* (2013.01)

(58) Field of Classification Search
CPC ............. H04B 10/801; H04Q 11/0003; H04Q 11/0062; H04Q 2011/0086
USPC ....................................................... 398/43–45
See application file for complete search history.

(56) References Cited

U.S. PATENT DOCUMENTS

| | | | | | |
|---|---|---|---|---|---|
| 4,932,735 | A  * | 6/1990 | Koai | ....................... | G02F 1/313 385/17 |
| 5,463,486 | A  * | 10/1995 | Stevens | .............. | H04Q 11/0005 385/24 |
| 6,044,088 | A  * | 3/2000 | Rahman | ................. | H04J 3/1611 370/465 |
| 6,647,010 | B1 * | 11/2003 | Ford | ................... | H04Q 11/0003 370/384 |
| 6,665,495 | B1 * | 12/2003 | Miles | ..................... | H04L 45/00 370/351 |
| 7,102,999 | B1 * | 9/2006 | Sindhu | .................... | H04L 49/45 370/235 |
| 7,106,967 | B2 * | 9/2006 | Handelman | ........ | H04Q 11/0005 370/232 |
| 7,251,386 | B1 * | 7/2007 | Dickinson | .............. | B82Y 20/00 385/129 |
| 8,780,927 | B2 * | 7/2014 | Julien | ................... | H04L 49/351 370/359 |
| 8,897,640 | B2 * | 11/2014 | Hui | .................... | H04Q 11/0005 398/56 |
| 9,166,704 | B1 * | 10/2015 | Nagarajan | ............. | H04B 10/70 |

(Continued)

OTHER PUBLICATIONS

O'Connor [ARM® 64-bit Coherent Scale Out over RapidIO®, Nov. 13, 2014.*

*Primary Examiner* — Oommen Jacob

(74) *Attorney, Agent, or Firm* — Heimlich Law, PC; Alan Heimlich, Esq.

(57) ABSTRACT

A Method and Apparatus for Flexible Coherent and Scale-out Computing Architecture have been disclosed. In one implementation a plurality of integrated photonics are used to effect communications.

15 Claims, 12 Drawing Sheets

(56) References Cited

U.S. PATENT DOCUMENTS

| | | | | |
|---|---|---|---|---|
| 9,432,298 B1* | 8/2016 | Smith | ................ | H04L 49/9057 |
| 9,614,787 B2* | 4/2017 | Rauh | .................. | H04L 49/1515 |
| 9,900,219 B2* | 2/2018 | Huey | ................ | H04L 41/0893 |
| 2002/0012143 A1* | 1/2002 | Graves | .............. | H04Q 11/0005 |
| | | | | 398/87 |
| 2002/0109884 A1* | 8/2002 | Presley | ............. | H04B 10/1125 |
| | | | | 398/121 |
| 2003/0193937 A1* | 10/2003 | Beshai | .............. | H04Q 11/0005 |
| | | | | 370/372 |
| 2004/0109283 A1* | 6/2004 | Emma | ................ | H01L 23/5387 |
| | | | | 361/750 |
| 2004/0223762 A1* | 11/2004 | Lee | .................. | H04Q 11/0005 |
| | | | | 398/51 |
| 2010/0049885 A1* | 2/2010 | Chandra | ................ | H04L 45/62 |
| | | | | 710/36 |
| 2010/0325308 A1* | 12/2010 | Keckler | ............. | G06F 15/7825 |
| | | | | 709/238 |
| 2014/0359195 A1* | 12/2014 | Nishiyashiki | ......... | G06F 13/409 |
| | | | | 710/317 |
| 2016/0261364 A1* | 9/2016 | Jiang | .................. | H04J 14/0282 |
| 2016/0314091 A1* | 10/2016 | Dutt | .................... | G06F 12/0817 |
| 2017/0171111 A1* | 6/2017 | Khare | .................... | H04L 49/30 |
| 2017/0357052 A1* | 12/2017 | Grieco | ..................... | G02B 6/14 |
| 2018/0013510 A1* | 1/2018 | Nagarajan | ............. | H04B 10/40 |
| 2018/0067888 A1* | 3/2018 | Sheth | .................... | G06F 13/364 |
| 2018/0081856 A1* | 3/2018 | Nagarajan | ............. | G06F 13/364 |

* cited by examiner

METHOD AND APPARATUS FOR FLEXIBLE COHERENT AND SCALE-OUT COMPUTING ARCHITECTURE

RELATED APPLICATION

The present application for patent claims priority to U.S. Patent Application No. 62/298,341 titled "Method and Apparatus for Flexible Coherent and Scale-out Computing Architecture" filed Feb. 22, 2016, and which is hereby incorporated herein by reference.

FIELD OF THE INVENTION

The present invention pertains to computing architecture. More particularly, the present invention relates to Method and Apparatus for Flexible Coherent and Scale-out Computing Architecture.

BACKGROUND OF THE INVENTION

There are serious limitations on scale-out architectures for computers and particularly on maintaining coherency.

Computing architectures based, for example, on ARM and RISC instructions don't support scale-out computing architecture that supports coherent and non-coherent traffic.

Due to limitation with DDR based interface bandwidth it is not possible to match the CPU processing capability with memory interface bandwidth and the I/O bandwidth.

As use case continues to change, it is not possible to support the above requirements with a fixed I/O protocol based computing architecture. Although software defined networking supports flexible I/O protocol, this does not address the memory interface, coherency, and non-coherency issues at the same time.

This presents a technical problem for which a technical solution using a technical means is needed.

BRIEF DESCRIPTION OF THE DRAWINGS

The invention is illustrated by way of example and not limitation in the figures of the accompanying drawings.

DETAILED DESCRIPTION

Figure 1:
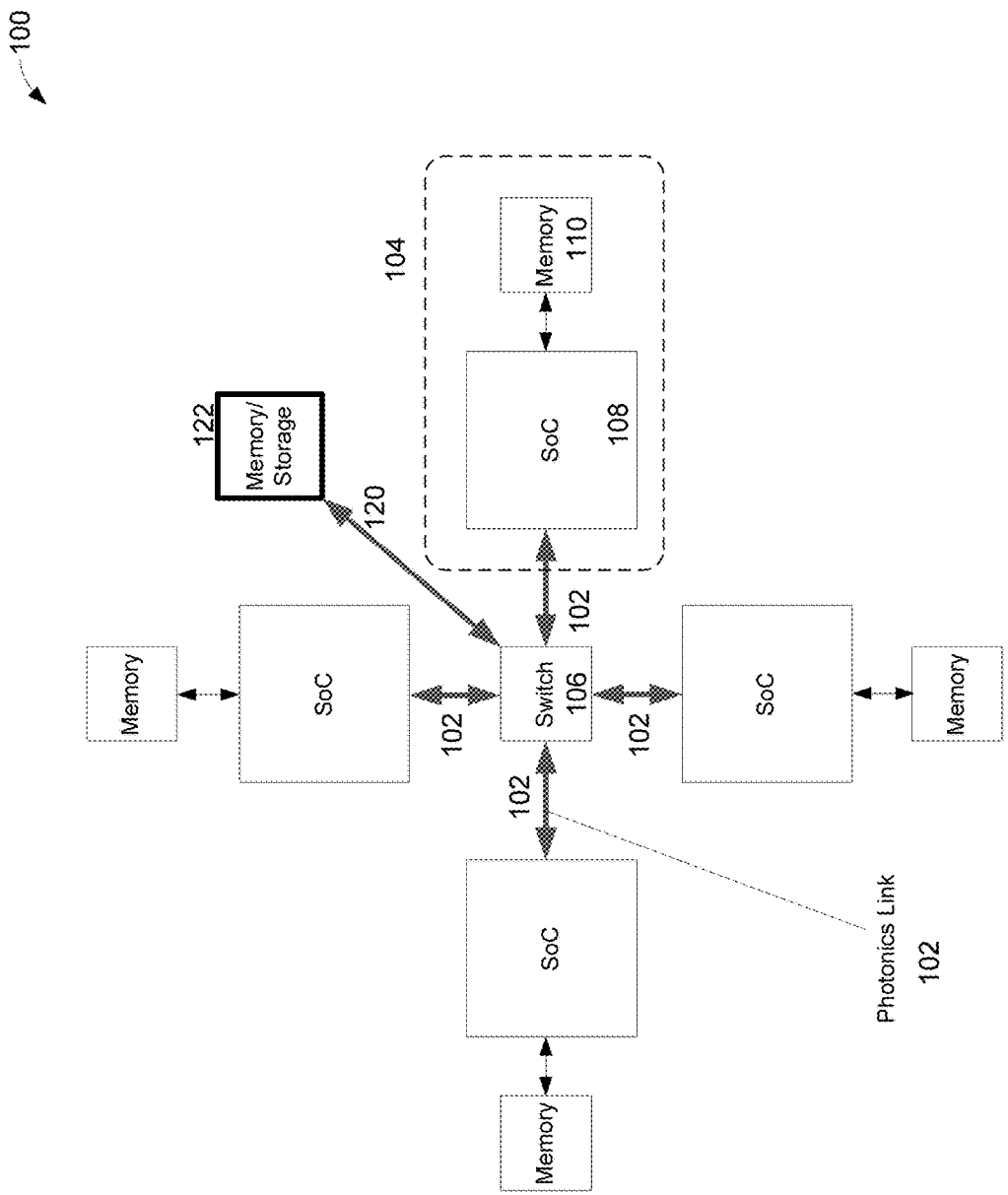
FIG. 1 illustrates one embodiment showing an architecture.

While embodiments of the invention utilize specific CPUs and memory for illustrative purposes, any CPU and memory may make use of the techniques disclosed.

In one embodiment the proposed schemes support scale-out multi-node computing and memory architectures for both coherent and non-coherent data through a baseline protocol with provision to support user defined protocol extensions.

In one embodiment the overall architecture supports two major functional units—Compute and Fabric (also referred to as System on a Chip (SoC), and Switch respectively).

In one embodiment the compute unit incorporates fixed and flexible protocol implementation logic with integrated photonics links to connect to the switch unit.

In one embodiment the switch unit incorporates on-chip (and/or off-chip) memory/storage for last level cache or shared memory and storage which are connected to the switch unit through high speed photonics links. The high speed photonics links (also referred to as photonics links or optical links) are integrated photonics links meaning they are on-chip. That is, they are part of the same integrated circuit (IC) as electronic circuitry.

In one embodiment the switch unit incorporates a baseline scheduler and supports scheduler decisions received from the first functional unit. Scheduler decisions are provided over one or more wavelengths. In one embodiment it is possible to change the scheduling algorithm either in the switch or the end-point as the scheduler is implemented using flexible logic.

In one embodiment the scheduling of packets can be performed on per wavelength or multi-wavelength basis.

In one embodiment the off-chip memory or storage can be implemented using SRAM/DRAM or non-volatile memory.

In one embodiment the computing architecture supports both coherent and non-coherent scale-out.

In one embodiment the coherent protocol is encapsulated on a generic packet format over RapidIO or Ethernet or PCIe or Omnipath.

In one embodiment the links between the SoC (System On a Chip) and the Switch and the memory/storage are implemented using high speed photonics link(s).

In one embodiment using high speed photonics link(s), it is possible to achieve significantly lower latency for both coherent and non-coherent traffic.

In one embodiment each photonics link can incorporate one or more wavelengths and use such.

In one embodiment each photonics link dedicates one or more wavelengths to forward the clock and the time of day to have network level synchronization.

In one embodiment each photonics link dedicates one or more wavelength to support transmission of scheduling decisions.

In one embodiment ARM and RISC based computing systems incorporate multiple CPUs, where each CPU has hierarchical caching, e.g., L1, L2, and shared L3 cache for on-chip cores.

In one embodiment each CPU has their own home memory which through L3 cache supports coherency across multiple cores inside the CPU.

In one embodiment in x86 based architectures, coherency is maintained through QPI or Hyper Transport Links.

In one embodiment coherency based scale-out is maintained using NUMA (Non-Uniform Memory Access) based device which connects to the QPI (QuickPath Interconnect) port of the x86 processor and supports multi-node scale-out.

In one embodiment the ARM and/or RISC based processor maintains communication and switching in a scale-out architecture for both coherent and non-coherent traffic using coherent scale-out protocol through a set of integrated silicon photonic devices. There are two functional units involved where they are connected using integrated photonics links. In one embodiment the first functional unit is one or more SoC+Memory. In one embodiment the second functional unit is a Switch. In one embodiment the first functional unit is one or more SoC without Memory. In one embodiment the first functional unit is one or more SoC without Memory where the SoC uses Memory accessed through the switch.

In one embodiment a first functional unit may have one or more processing units where each processing unit includes a CPU, a flexible fabric controller and accelerator functions. Accelerator functions may include, but are not limited to, remote memory acceleration, compression acceleration, forward error correction (FEC) acceleration, security acceleration, CORDIC (COordinate Rotation Digital Computer) acceleration, etc.

In one embodiment a first functional unit is connected to a second functional unit thorough integrated photonics.

In one embodiment a first functional unit has a flexible fabric controller that optionally provides switch scheduler decisions.

In one embodiment a second functional unit has a Switch device that incorporates a configurable fabric controller and is connected to a first functional unit through integrated silicon photonic links.

In one embodiment a second functional unit has a fabric controller that incorporates a baseline scheduler to switch traffic between different I/O controllers.

In one embodiment optionally, it is possible to configure the fabric controller to receive scheduling decisions from the First Functional unit through the integrated photonics link.

In one embodiment a second functional unit has a Switch Fabric with Last-level Cache.

In one embodiment as an alternative implementation, the switch module could implement last level cache on-chip or off-chip where off-chip memory is connected to the switch using an optical link.

In one embodiment part of the on-chip or off-chip memory can be used shared storage in a multi-CPU cluster.

In one embodiment the off-chip memory can be implemented using S-RAM, or D-RAM, or non-volatile memory.

In one embodiment the I/O controller can be implemented with flexible logic such that controller protocol can be changed.

In one embodiment the memory interface between the switch fabric and the off-chip memory (or storage) is implemented using a fiber link, therefore bandwidth could be scaled by supporting multiple wavelengths per fiber and multiple fibers per link.

In one embodiment since the memory (or storage) can be shared between multiple SoCs, individual memory for each SoC can be eliminated.

In one embodiment the second functional unit has Switch Fabric with Last-level Cache/Shared Memory or Storage.

In one embodiment the second functional unit by using high speed photonics link between Switch and the shared memory/storage, it is possible to remove the individual main memory, such as DRAM that is connected to an individual SoC. Additionally, it is also possible to remove the individual level 3, 4, and shared memory for a SoC. The main memory, level 3, level 4, and shared memory can be, for example, but are not limited to SRAM (static random access memory), DRAM (dynamic random access memory), and can be connected in a 3D (dimension) configuration.

In one embodiment the second functional unit can build scale-out architecture by connecting photonics link from the switch to other SoCs or Switch units.

In one embodiment the I/O Controller has Integrated Photonics.

In one embodiment the I/O Controller has integrated photonics and the I/O controller is implemented either as a fixed function or in flexible logic.

In one embodiment the I/O Controller has integrated photonics and the I/O controller implements either scale-out coherency protocol that supports both coherent non-coherent traffic based on RapidIO when used with, for example, ARM, RISC, or Power based processors or Omnipath when x86 processors. Alternatively, it is possible to transmit the coherency protocol over standard Ethernet or a PCIe based I/O controller.

In one embodiment the I/O Controller has integrated photonics and each I/O controller incorporates either one of more End-points which implements the protocol functions.

In one embodiment the I/O Controller has integrated photonics and data is transported over one or more lanes (up to N lanes per End-point, where N is a positive integer greater than 0) between the End-points and the Integrated photonics module (IPM).

In one embodiment the I/O Controller has integrated photonics and each lane represents 8, 16, 20, 32, or 40-bit electrical signals (up to T Transmit and R Receive signals (where T is a positive integer greater than 0, and where R is a positive integer greater than 0) for the transmit and a similar number for the receive.

In one embodiment the I/O Controller has integrated photonics and the IPM transports data from a lane to a wavelength (either lambda—0, −1, . . . , or L−1).

In one embodiment the I/O Controller has integrated photonics and a particular wavelength can transport data from either End-point 0 or End-point 1, or any other End-point. This is a form of switching of data between the End-points and the wavelengths. This is achieved through flexible logic that is used to implement the end-point functions.

In one embodiment the I/O Controller has integrated photonics and out of L wavelengths (where L is a positive integer greater than 0), one wavelength is used to transmit the clock.

In one embodiment the I/O Controller has integrated photonics and in addition either one or more wavelengths is used to communicate scheduler decisions for the switch from the Fabric Scheduler.

In one embodiment there is an End-Point in the I/O Controller.

In one embodiment the End-point implements a flexible protocol parser and maintains coherency using a directory based architecture. In this case, the End-point directly communicates with the on-chip AMBA (Advanced Microcontroller Bus Architecture), AXI (Advanced eXtensible Interface), ACE (AXI Coherency Extensions), or CHI (Coherent Hub Interface) bus for an ARM based processor. For RISC or PowerPC or x86 an appropriate on-chip bus is used.

In one embodiment the End-point can implement a pool of DMA engine and a pool of DMA descriptors to transport data from on-chip memory, or off-chip memory, or on-chip L3 cache and the flexible protocol parser. When there are more than one End-Point, the DMA pools can be shared.

In one embodiment the flexible protocol parser may use RapidIO or other suitable protocol to transfer data to the integrated photonics element.

In one embodiment there is Fabric and a Scheduler.

In one embodiment the scheduling decision can be performed based on the baseline scheduling algorithm or the scheduling decision received over a set of wavelength(s) from the first functional unit.

In one embodiment scheduling is performed at wavelength or multi-wave length granularity. Therefore ingress packets from one or more wavelengths can be transmitted on a different wavelength on the egress.

FIG. 1 illustrates, generally at 100, one embodiment showing an architecture. In the architecture, for example, ARM and RISC based processors maintain communication and switching in a scale-out architecture for both coherent and non-coherent traffic using coherent scale-out protocol through a set of integrated silicon photonic devices (Photonics Link 102). There are two functional units involved where they are connected using integrated photonics links 102. The first functional unit (example at 104) is one or more System on a Chip (108) with Memory (110) (SoC+ Memory), and the second functional unit is the Switch 106. In one embodiment the SoC (108) may not be connected to local main Memory 110. That is, the SoC 108 may access a remote main memory by using Switch 106, for example, via photonics link 120 going to Memory/Storage 122.

Figure 2:
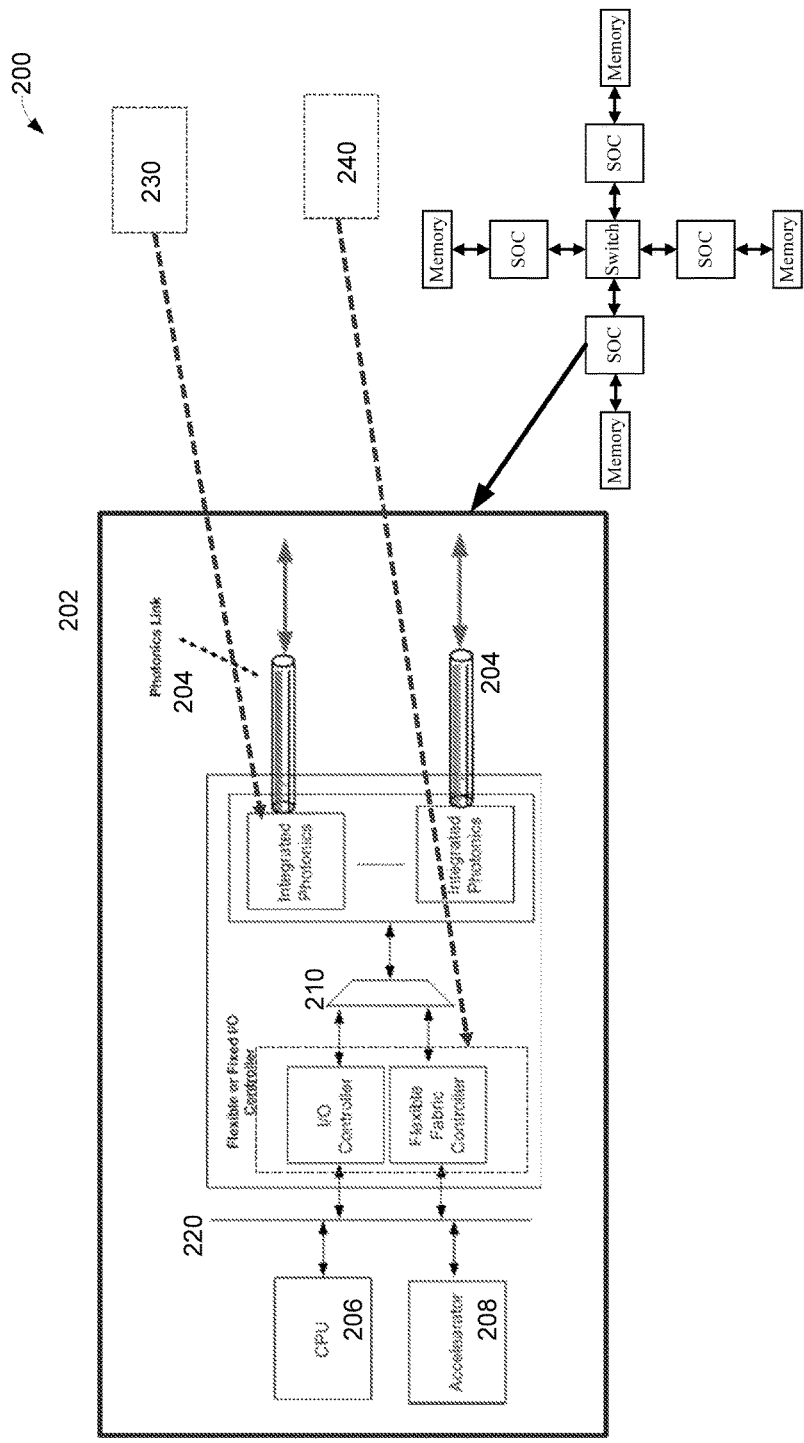
FIG. 2 illustrates one embodiment of a first functional unit implementation.

FIG. 2 illustrates, generally at 200, one embodiment of a first functional unit implementation, showing an expanded view 202 of the SoC, for example as shown in FIG. 1. At 204 is a Photonics Link. At 230 is Integrated Photonics and at 240 is a Flexible or Fixed I/O (Input Output) Controller. At 220 is a bus interfacing a CPU 206 with an Accelerator 208 and block 240. Block 240 interfaces to block 230 through a multiplexer/demultiplexer 210.

Figure 3:
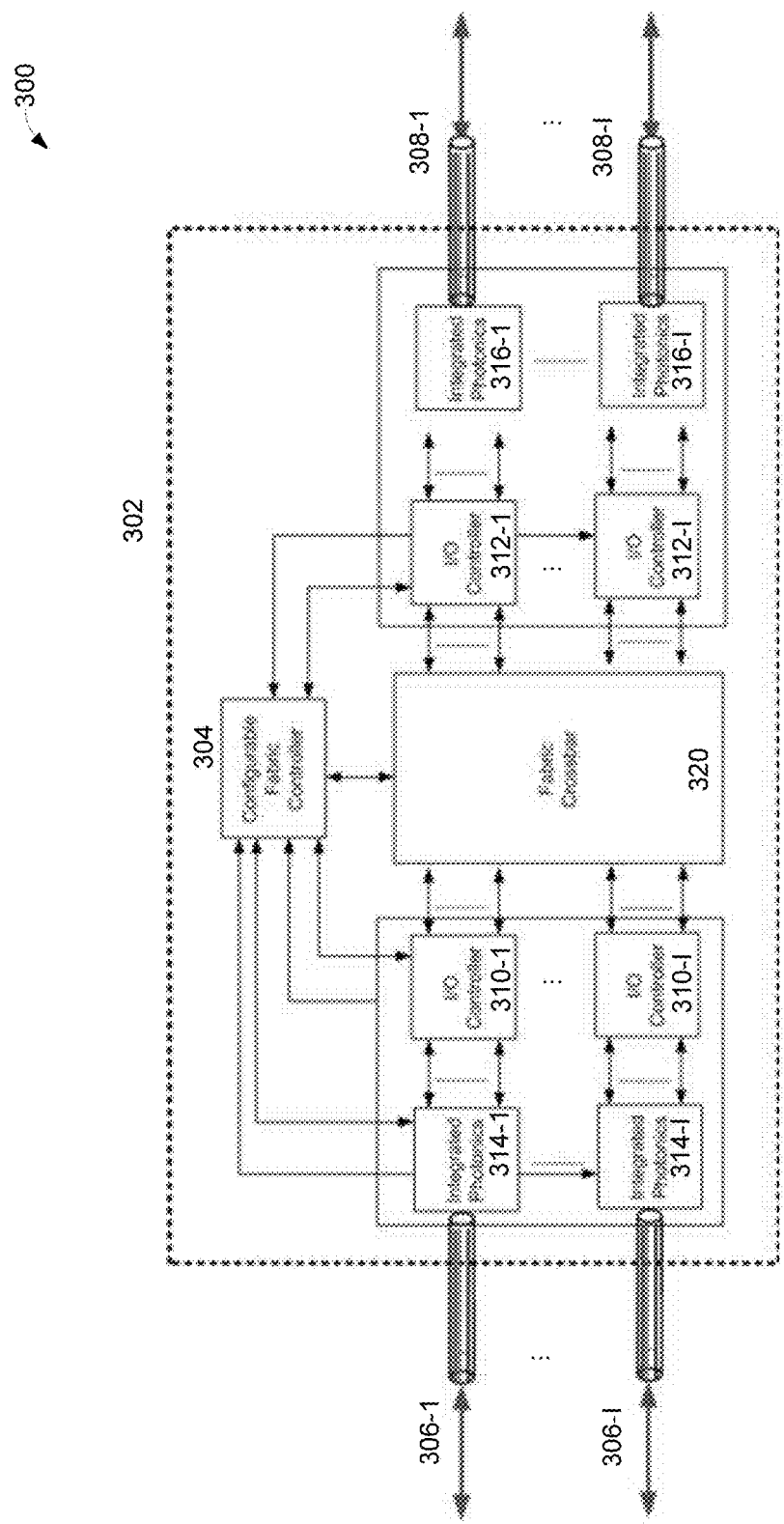
FIG. 3 illustrates one embodiment of a second functional unit implementation.

FIG. 3 illustrates, generally at 300, one embodiment of a second functional unit implementation, showing an expanded view 302 of the Switch for example as shown in FIG. 1 at 106. In one embodiment, the Switch 302 device (the second functional unit) is implemented based on a configurable fabric controller 304 and is connected to the first functional unit through integrated silicon photonic links, such as shown at 306-1 to 306-I, and 308-1 to 308-I (where I is a positive integer greater than 1). In one embodiment the fabric controller (without configurable features also located at 304) incorporates a scheduler to switch traffic between different I/O controllers, such as 310-1 to 310-I and 312-1 to 312-I (where I is a positive integer greater than 1). Optionally, it is possible to configure the fabric controller to receive scheduling decisions from the First Functional unit through the integrated photonics link, such as, for example, 314-1 to 314-I, and 316-1 to 316-I (where I is a positive integer greater than 1). At 320 is the Fabric Crossbar.

Figure 4:
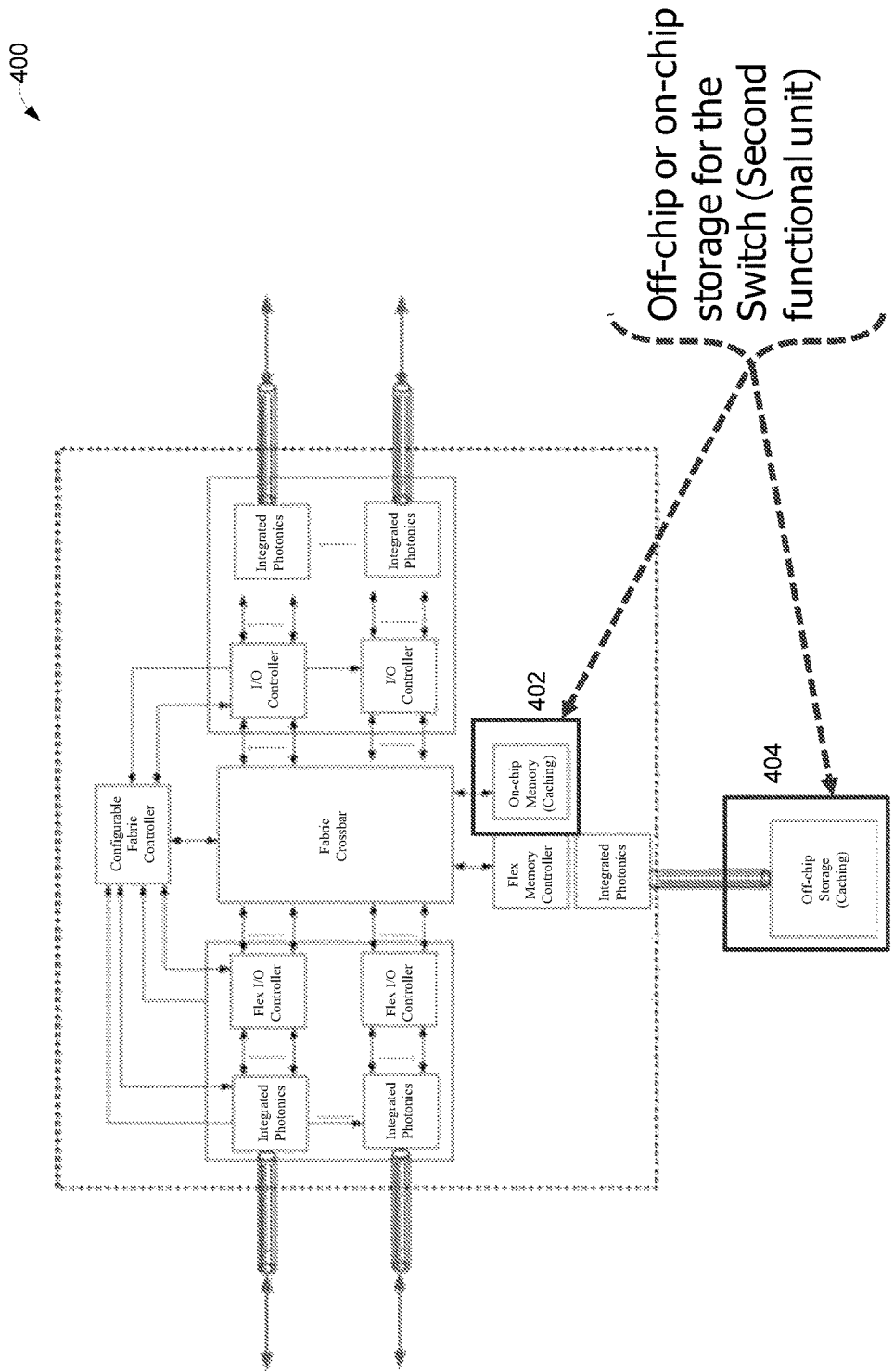
FIG. 4 illustrates one embodiment of a second functional unit implementation, showing on-chip and off-chip memory storage options.

FIG. 4 illustrates, generally at 400, one embodiment of a second functional unit implementation, showing on-chip 402 memory and off-chip memory 404 storage options. That is 402 may be present only, or 404 present only, or both 402 and 404 present. In various embodiments, the Second functional unit, the Switch Fabric has Last-level Cache (i.e., on-chip memory). Alternatively, the switch module implements last level cache on-chip or off-chip where off-chip memory is connected to the switch using an optical link. Part of the on-chip or off-chip memory can be used shared storage in a multi-CPU cluster. The off-chip memory could be implemented using S-RAM, or D-RAM, or storage class or non-volatile memory. The I/O controller can be implemented with flexible logic such that controller protocol can be modified. The memory interface between the switch fabric and the off-chip memory (or storage) is implemented using fiber link, therefore bandwidth can be scaled by supporting multiple wavelengths per fiber and multiple fibers per link. Further since the memory (or storage) can be shared between multiple SoCs, individual memory for each SoC could be eliminated as discussed above (and shown infra).

Figure 5:
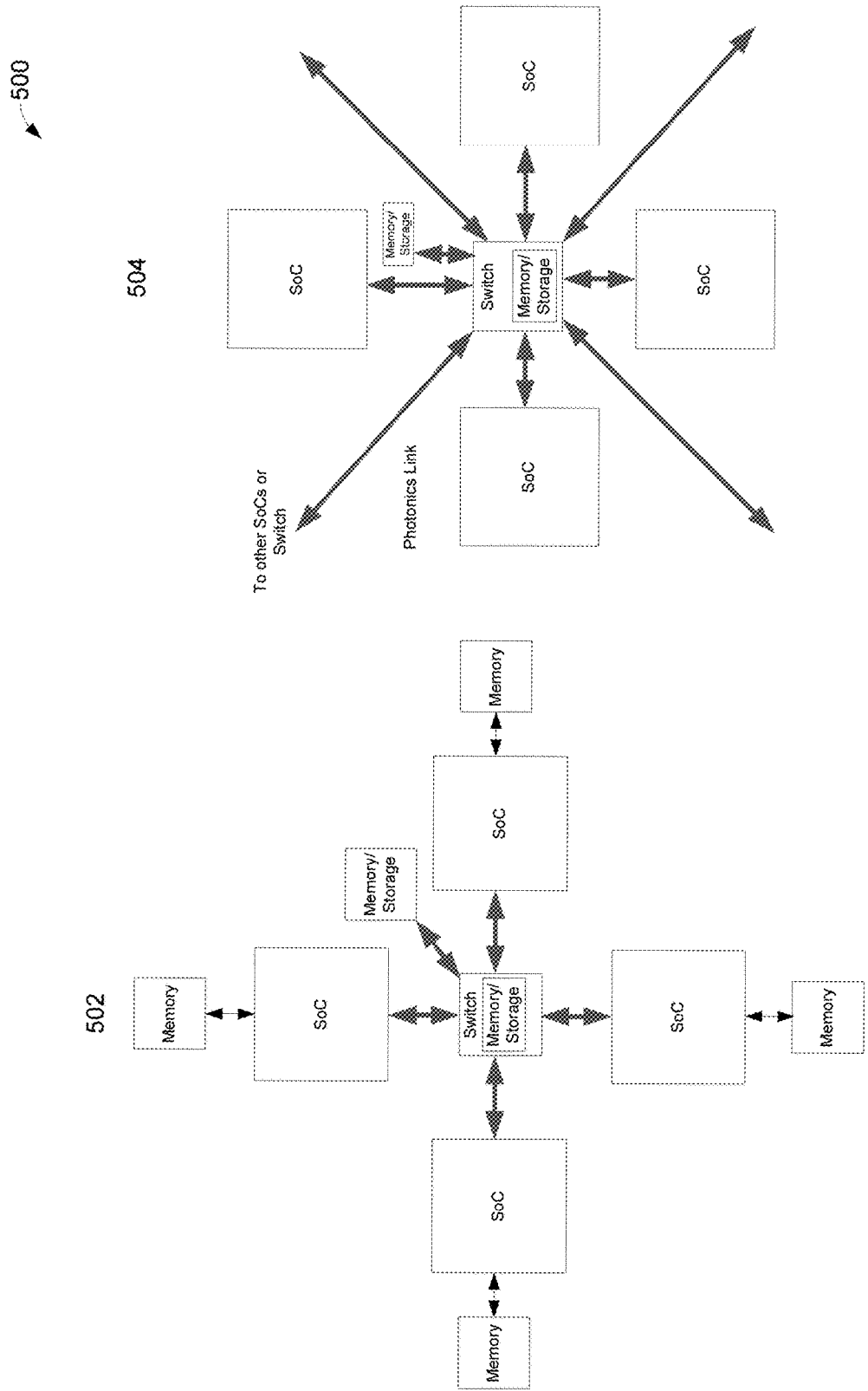
FIG. 5 illustrates various embodiments.

FIG. 5 illustrates, generally at 500, a first embodiment 502 and a second embodiment 504. 502 shows a group of four SoCs with memory and a switch having on-chip and off-chip memory. At 504 is shown a configuration using SoCs without on-chip memory and expanding the connection of the Switch to other SoCs or other switches. In one embodiment the Second functional unit, the Switch Fabric has Last-level Cache/Shared Memory or Storage. With high speed photonics link between the Switch and the shared memory/storage, it is possible to remove the individual memory for each SoC. It is also possible to build scale-out architecture by connecting photonics link from the switch to other SoCs or Switch units.

Figure 6:
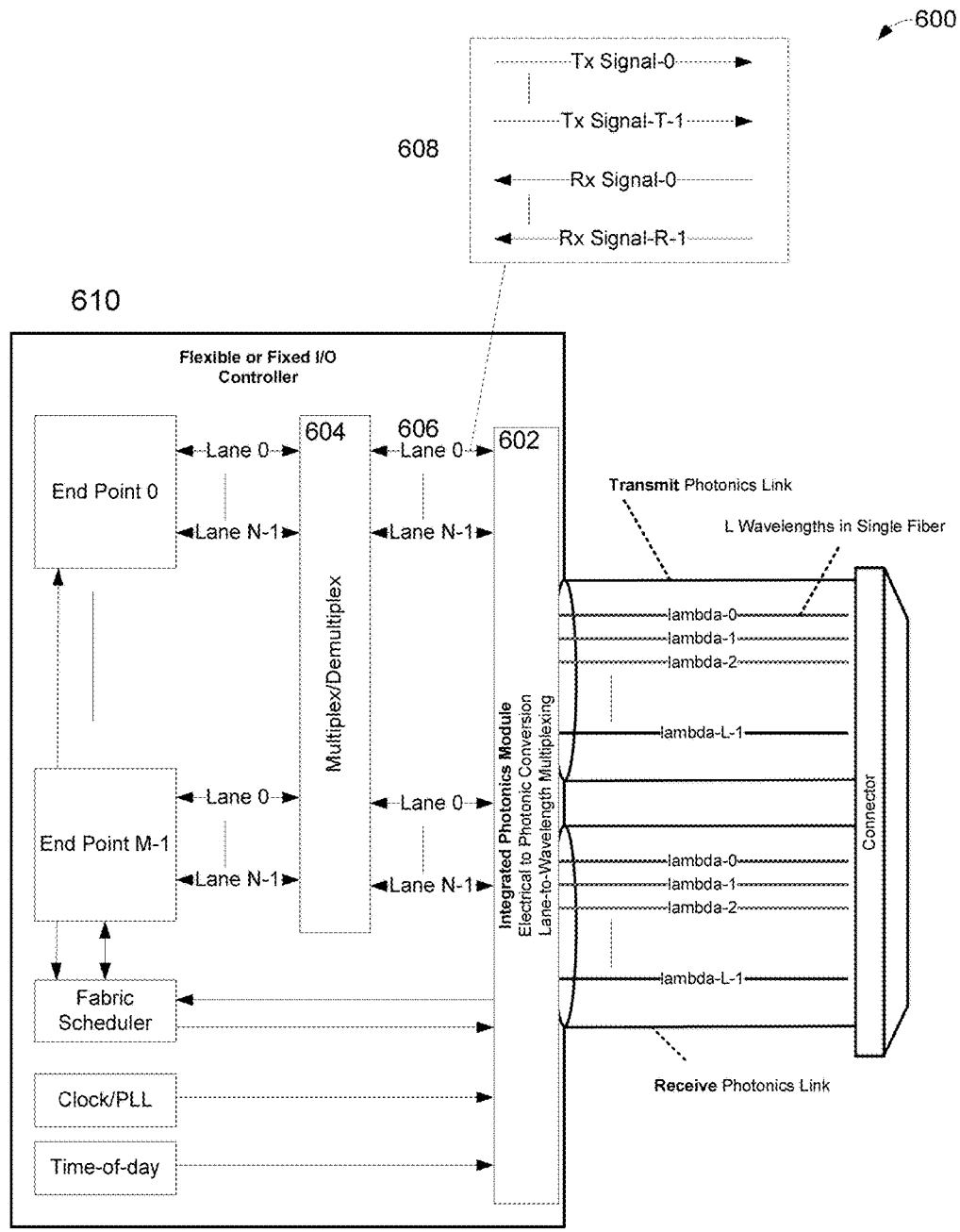
FIG. 6 illustrates an embodiment of a flexible or fixed I/O controller having an integrated photonics module.

FIG. 6 illustrates, generally at 600, an embodiment of a flexible or fixed I/O controller having an integrated photonics module (IPM) 602 such as shown at 230 in FIG. 2. At 604 is a Multiplex/Demultiplex unit such as shown at 210 in FIG. 2. At 606 is a representative Lane (here Lane 0) and at 608 a representative expansion of the signals in the respective Lane. At 608 T and R (as in Signal—T−1 and Signal R−1) are positive integers greater than 0). At 610 is the Flexible or Fixed I/O Controller, as for example, shown in FIG. 1 at 240. In one embodiment the IPM has an I/O Controller with Integrated Photonics. The I/O controller can be implemented either as a fixed function or in flexible logic. The I/O controller implements either scale-out coherency protocol that supports both coherent non-coherent traffic based on RapidIO when used with ARM, RISC, or Power based processors or Omnipath when x86 processors. Alternatively, it is possible to transmit the coherency protocol over standard Ethernet or PCIe based I/O controller. Each I/O controller incorporates either one of more End-points which implements the protocol functions. Data is transported over one or more lanes (upto N lanes per End-point, N being a positive integer greater than 0) between the End-points and the Integrated photonics module (IPM). Each lane represents 8, 16, 20, 32, or 40-bit electrical signals (upto T Transmit and R Receive signals (T and R being a positive integer greater than 0) for the transmit and similar number for the receive. The IPM transports data from a lane to a wavelength (either lambda—0, 1, 2, . . . , or L−1). The IPM implements parsing of four different type of information: 1) Data packets, 2) Control packets, 3) Scheduling packets, and 4) Clocking. The IPM maps the above information to different wavelengths.

A set of wavelengths is used to transport data from either one or more End-points (i.e., End-point 0 or End-point 1, . . . , End-point M−1, (M being a positive integer greater than 0)). A particular end-point implements RapidIO protocol, whereas, the other end-point implements Ethernet, time-synchronized networking based Ethernet protocol. This is a form of switching of data between the End-points and the wavelengths. This is achieved through flexible logic that is used to implement the end-point functions.

Control packets such as configuration, monitoring and time synchronization packets (such as IEEE 1588 time synchronization packets) are transferred either over the same wavelength that carry the data packets or a separate wavelength depending on the system architecture.

Scheduling packets are transferred between the SoC and the Switch Fabric either over the same wavelength that carry the data packets periodically, or utilizes a different wavelength to communicate packet scheduling information such as packet routing table.

One wavelength is used to is used to transport the clock when out-of-band clocking is required.

In one embodiment, there is a switching aspect to the IPM. That is mapping lane to wavelength implementation. In one embodiment this may be mapped randomly. In another embodiment is may be based on feedback on QoS. Further based on destination we can employ wavelength multiplexing (see for example a table infra. Further register sets and initialization procedures are flexible.

Figure 7:
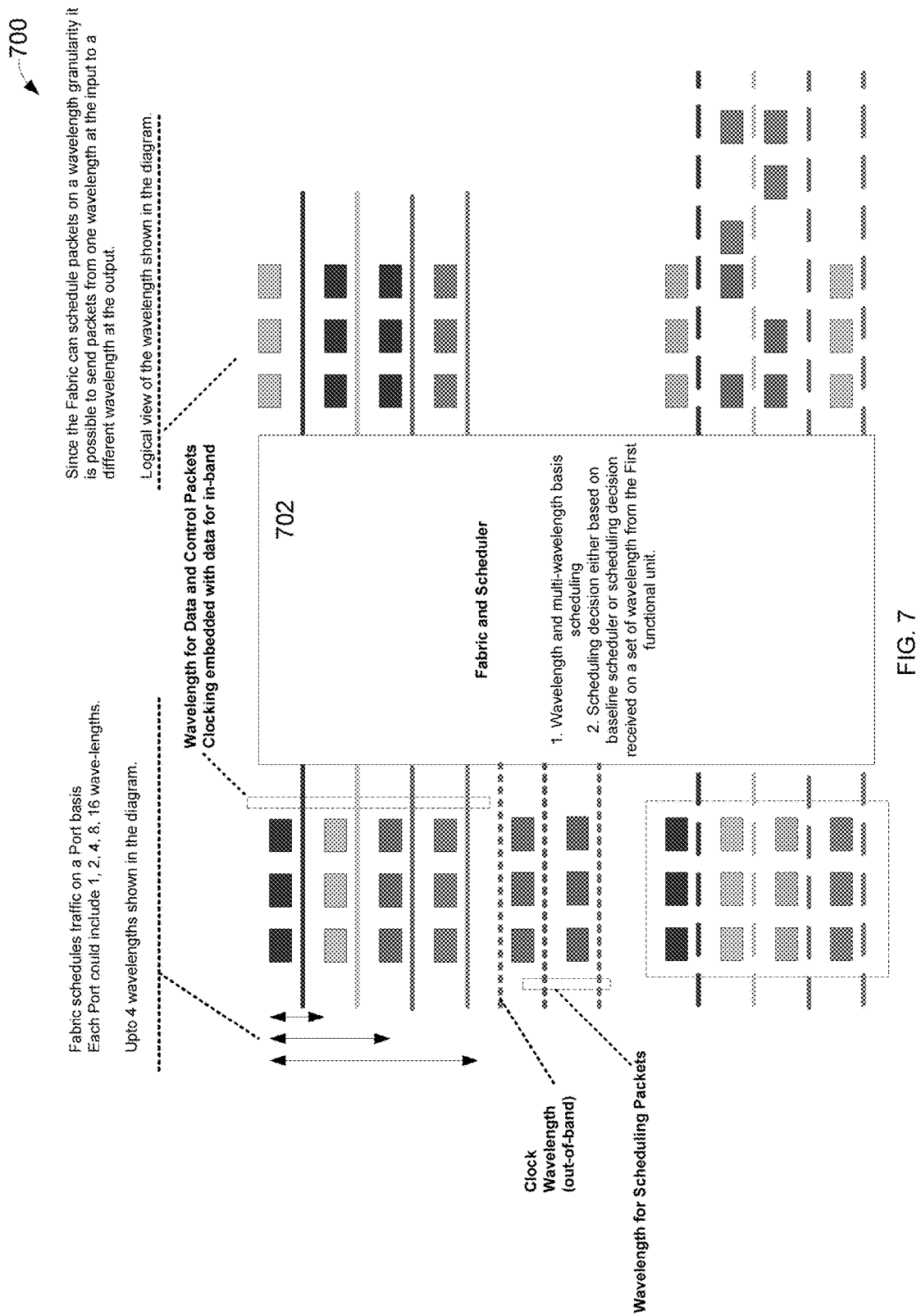
FIG. 7 illustrates an embodiment showing an example implementation of data, control, and scheduling packets over different wavelengths.

FIG. 7 illustrates, generally at 700, an embodiment showing an example implementation of data, control, and scheduling packets over different wavelengths. As can seen then Fabric and Scheduler 702 can handle a variety of configurations. The scheduling decision could be performed based on a pre-defined scheduling algorithm or the scheduling decision received over a set of wavelength from the first functional unit. In one embodiment scheduling is performed at wavelength or multi-wave length granularity. Therefore ingress packets from one or more wavelength can be transmitted on a different wavelength on the egress.

Figure 8:
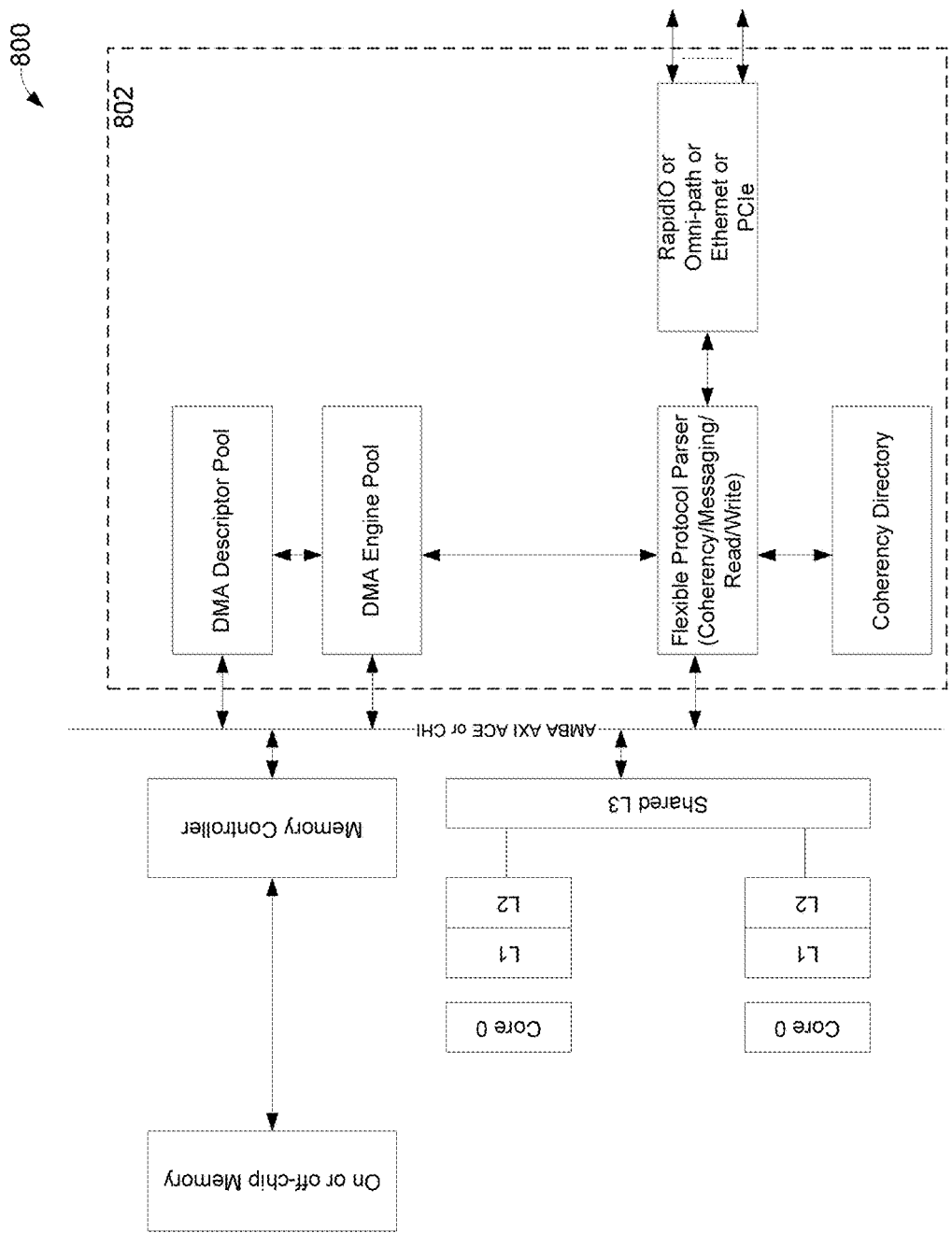
FIG. 8 illustrates an embodiment showing in more detail an I/O controller.

FIG. 8 illustrates, generally at 800, an embodiment showing in more detail at 802 an I/O controller, for example a flexible or fixed I/O controller such as, for example, shown at 240 in FIG. 2. In one embodiment the I/O controller handles End-points.

The End-point implements a flexible protocol parser and maintains coherency using directory based architecture. In one embodiment, the End-point directly communicates with the on-chip AMBA AXI ACE or CHI bus for ARM based processor. For RISC or Power or x86 an appropriate on-chip bus is used.

The End-point can implement a pool of DMA (direct memory access) engines and a pool DMA descriptors to transport data from on-chip memory, or off-chip memory, or on-chip L3 cache and the flexible protocol parser. When there are more than one End-point, the DMA pools can be shared. The flexible protocol parser can use RapidIO or other suitable protocol (Omnipath, Ethernet, or PCIe) to transfer data to the integrated photonics element.

Figure 9:
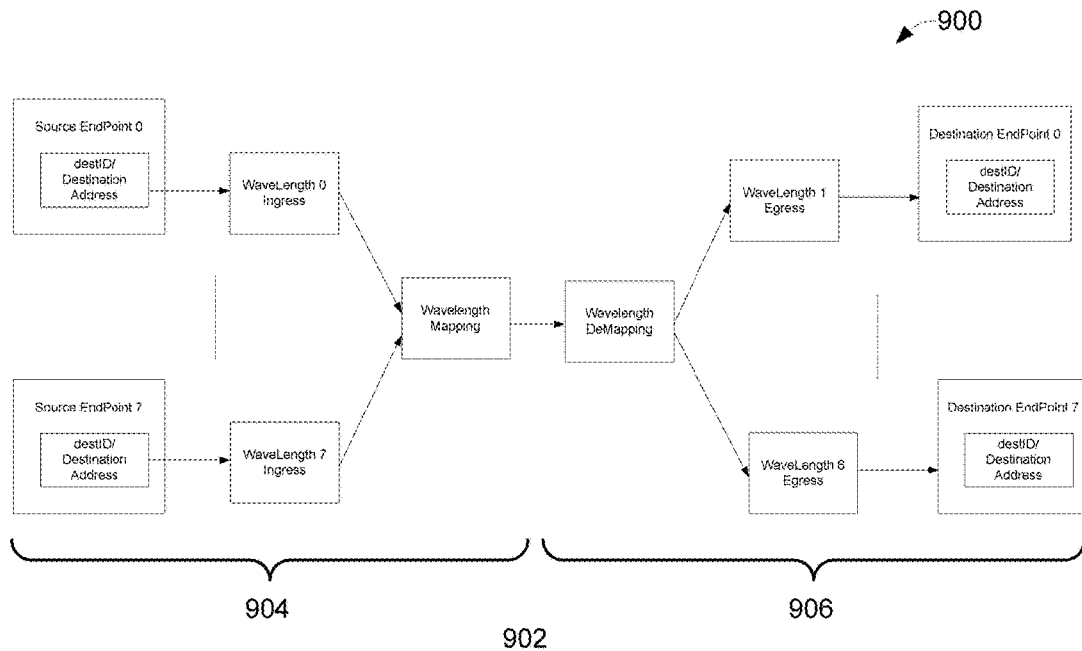
FIG. 9 illustrates an embodiment showing a wavelength mapping implementation

FIG. 9 illustrates, generally at 900, an embodiment showing a wavelength mapping implementation. At 902 is a diagrammatic mapping from a source endpoint (end-point) 904 to a destination endpoint 906. At 920 is shown the wavelength-endpoint mapping table. This can also be thought of as Lane (Destination ID and Destination Address) to Wavelength Mapping. In one embodiment each fiber link carries up-to 8 wavelengths for data packets. With flexible memory based packet format it is possible to allocate a different number of end-point packets to a different number of wavelengths.

For example, one implementation configuration is: RapidIO protocol is implemented in minimum of 6 lanes-wavelengths (maximum 8 lanes)—lane 0 to 5 and Ethernet protocol is implemented in maximum of 2 lanes-wavelengths—lanes 6 and 7 when lanes these lanes are not used by RapidIO.

Mapping from lane 0 (corresponding to destination id 0) is mapped to wavelength 0 on ingress and to wavelength 1 on egress while leaving the switch, similarly for other lanes and destination IDs as shown in the destination id to wavelength mapping.

Figure 10:
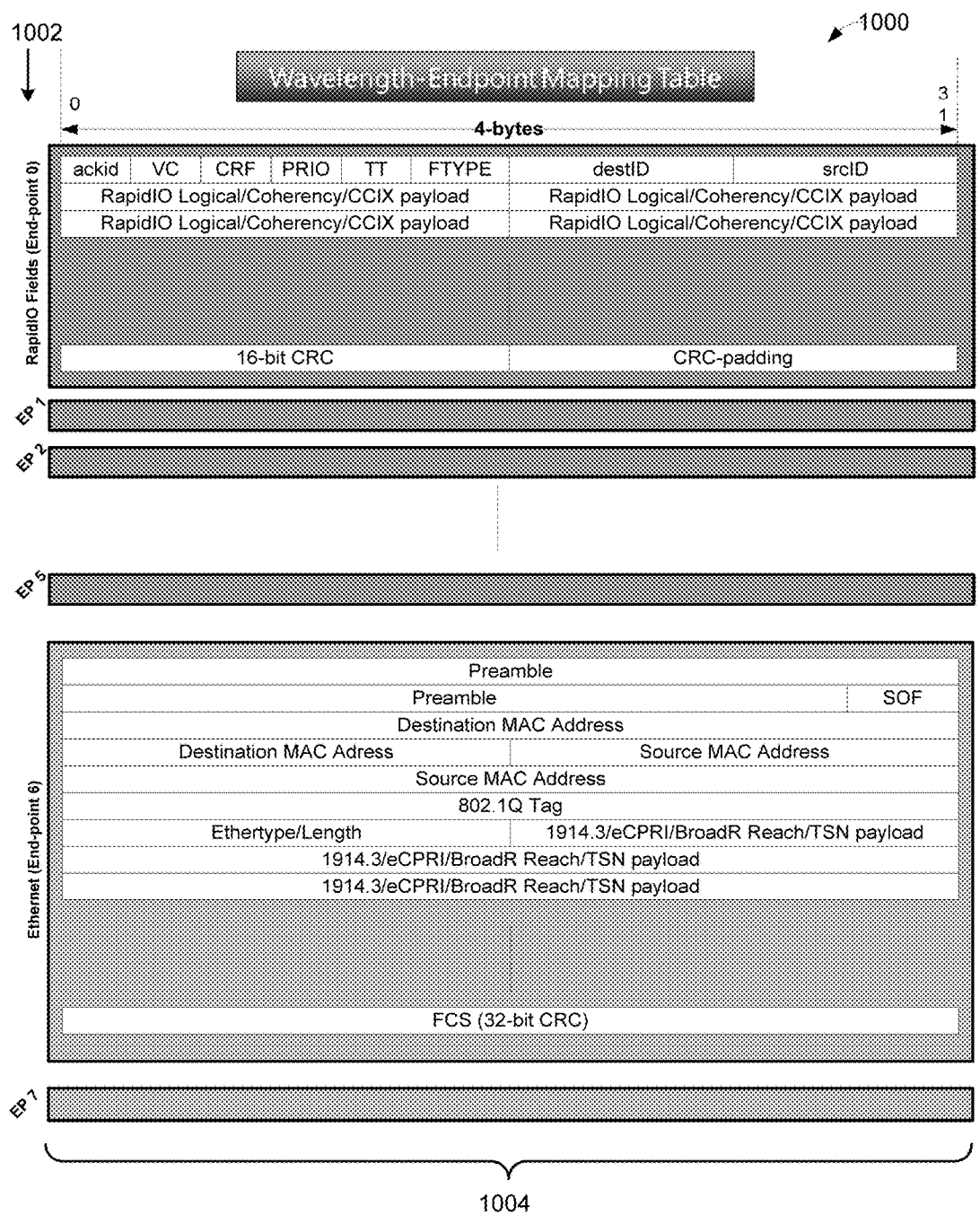
FIG. 10 illustrates an embodiment showing a Wavelength-Endpoint Mapping Table.

FIG. 10 illustrates, generally at 1000, an embodiment showing a Wavelength-Endpoint Mapping Table. At 1002 may be seen the end-points (EP) and at 1004 the byte fields (4 shown). In this embodiment EP0 through EP5 are RapidIO Fields, and EP6 and EP7 are Ethernet fields as shown. Having a flexible packer parser such as this allows great flexibility.

That is, a flexible packet parser implementation supports different types of packet formats.

For example packet format for RapidIO, Coherency, and CCIX is shown in FIG. 10.

For example packet format for Ethernet, IEEE 1914.3 front-haul, BroadR Reach automotive, and TSN (time synchronized networking) packet is shown in FIG. 10.

As discussed infra, flexible memory in the parser can be used to support hybrid packet mapping.

Figure 11:
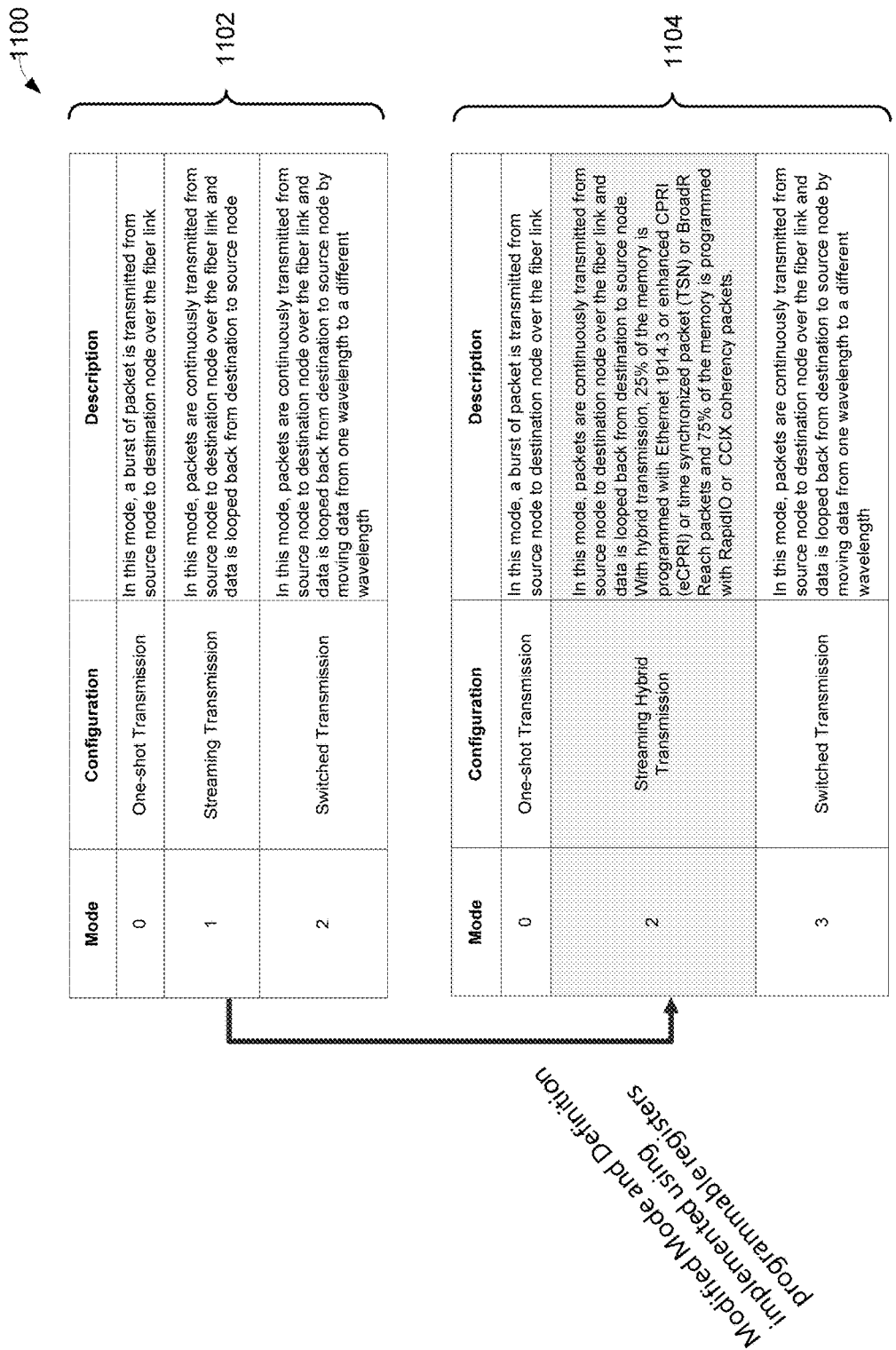
FIG. 11 illustrates an embodiment showing configuration and register map of a device.

FIG. 11 illustrates, generally at 1100, an embodiment showing configuration and register map of a device. At 1102 is, for example, standard Modes 0, 1, and 2. At 1104 is shown, for example, a Modified Mode and Definition implemented using programmable registers. In the modified mode 1104 it will be noted that Mode 2 is a Streaming Hybrid Transmission while Mode 0 at 1102 and 1104 are the same, and Mode 3 at 1102 has similar functionality to Mode 2 at 1102.

Having this mode configuration, as shown, up to 3 modes are supported. In other embodiments more modes are supported. Thus it can be see that implementing flexible registers allows for the modification of the definition and purpose of the Modes. In one embodiment the configuration and register map of the device, may be done using, for example, the I²C interface.

Figure 12:
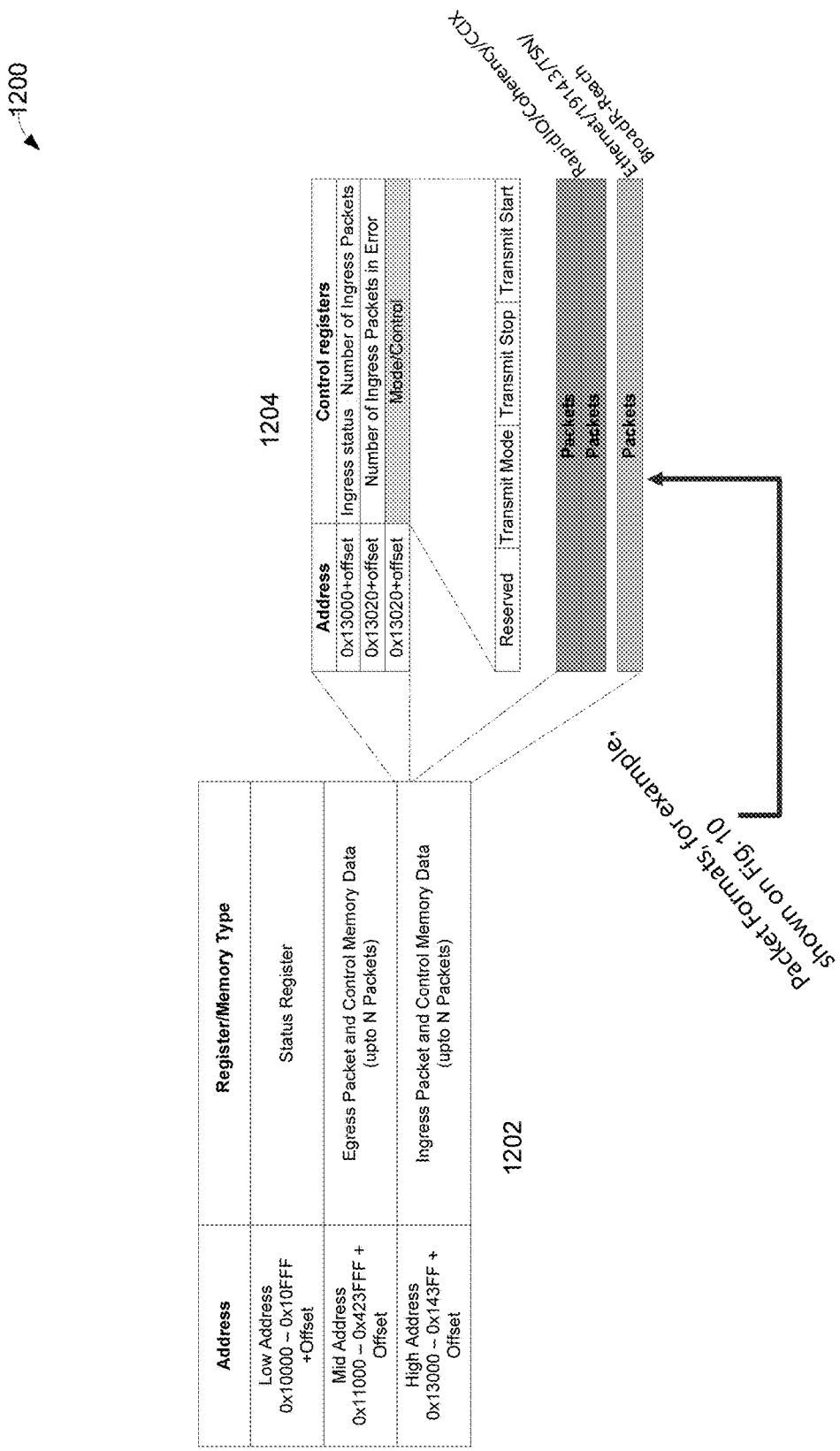
FIG. 12 illustrates an embodiment showing configuration and register map of a device.

FIG. 12 illustrates, generally at 1200, an embodiment showing configuration and register map of a device. At 1202 is, for example, the Address and the corresponding Register/Memory Type. At 1204 is an expanded view showing more details and at the bottom 3 Packets are show the packet formats, for example, as shown in FIG. 10 supra.

Thus Method and Apparatus for Flexible Coherent and Scale-out Computing Architecture has been described.

Because of the high speed embodiments the present invention requires specialized hardware, for example, but not limited to, on-chip (integrated) photonics.

As used in this application, "one embodiment" or "an embodiment" or similar phrases means that the feature(s) being described are included in at least one embodiment of the invention. References to "one embodiment" in this application do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

As used in this application, "substantially" or "substantially equal" or similar phrases are used to indicate that the items are very close or similar. Since two physical entities can never be exactly equal, a phrase such as "substantially equal" is used to indicate that they are for all practical purposes equal.

As used in this application "fiber" or similar phrases means an optical fiber.

It is to be understood that in any one or more embodiments of the invention where alternative approaches or techniques are discussed that any and all such combinations as may be possible are hereby disclosed. For example, if there are five techniques discussed that are all possible, then denoting each technique as follows: A, B, C, D, E, each technique may be either present or not present with every other technique, thus yielding 2^5 or 32 combinations, in binary order ranging from not A and not B and not C and not D and not E to A and B and C and D and E. Applicant(s) hereby claims all such possible combinations. Applicant(s) hereby submit that the foregoing combinations comply with applicable EP (European Patent) standards. No preference is given any combination.

Thus Method and Apparatus for Flexible Coherent and Scale-out Computing Architecture have been described.

What is claimed is:

1. A system for communicating and switching in a scale-out architecture comprising:
    a first functional unit, the first functional unit comprising one or more systems on a chip (SoC), each SoC having one or more integrated photonic interfaces;
    a second functional unit, the second functional unit being a switch, the switch having one or more integrated photonic interfaces;
    one of the first functional unit integrated photonic interfaces coupled to one of the second functional unit integrated photonic interfaces thereby forming a photonics link; and
wherein the first functional unit comprises:
    one or more processing units, wherein each processing unit includes a central processor unit (CPU) coupled to a bus;
    one or more accelerator functions coupled to the bus;
    a flexible fabric controller coupled to the bus and coupled to a first input of a multiplexer/demultiplexer; and
    a fixed input output controller coupled to the bus and coupled to a second input of the multiplexer/demultiplexer.

2. The system of claim 1 wherein the communicating and switching can handle both coherent and non-coherent traffic using a coherent scale-out protocol through the photonics link.

3. The system of claim 1 further comprising an output of the multiplexer/demultiplexer coupled to the one or more integrated photonic interfaces.

4. The system of claim 3 wherein the flexible fabric controller provides scheduler decisions for the switch.

5. The system of claim 1 wherein the second functional unit comprises:
    a first interface unit coupled to a fabric crossbar;
    a second interface unit coupled to the fabric crossbar; and
    a configurable fabric controller coupled to the first interface unit and the second interface unit and the fabric crossbar.

6. The system of claim 5 wherein the first interface unit further comprises one or more sets of an integrated photonics module coupled to one or more photonic ports and to an input output (I/O) controller wherein the I/O controller is also coupled to the fabric crossbar.

7. The system of claim 5 wherein the second interface unit further comprises one or more sets of an integrated photonics module coupled to one or more photonic ports and to an input output (I/O) controller wherein the I/O controller is also coupled to the fabric crossbar.

8. The system of claim 6 wherein the second interface unit further comprises one or more sets of an integrated photonics module coupled to one or more photonic ports and to an input output (I/O) controller wherein the I/O controller is also coupled to the fabric crossbar.

9. The system of claim 8 wherein the configurable fabric controller incorporates a scheduler, the scheduler to switch traffic between different I/O controllers.

10. The system of claim 8 wherein the configurable fabric controller incorporates a scheduler, the scheduler receiving scheduling decisions from the first functional unit through the photonics link.

11. The system of claim 5 wherein the fabric crossbar is coupled to on-chip memory.

12. The system of claim 5 wherein the fabric crossbar is coupled to off-chip memory through an optical link.

13. The system of claim 12 wherein the optical link further comprises an entity from the group consisting of multiple optical fibers, multiple wavelengths per optical fiber, and multiple optical fibers and multiple wavelengths per optical fiber.

14. The system of claim 1 wherein each SoC has on-chip memory selected from the group consisting of attached level 3 memory, shared memory, and level 3 memory and shared memory.

15. The system of claim 1 wherein each SoC has no on-chip memory attached selected from the group consisting of level 3 memory, shared memory, and level 3 memory and shared memory.

* * * * *